No. 751,538. PATENTED FEB. 9, 1904.
S. N. MURDOCK.
GAGE COCK.
APPLICATION FILED SEPT. 28, 1903.
NO MODEL.

WITNESSES:
H. B. Bradshaw
A. L. Phelps

INVENTOR
Samuel N. Murdock
BY
C. C. Shepherd
ATTORNEY

No. 751,538. Patented February 9, 1904.

UNITED STATES PATENT OFFICE.

SAMUEL N. MURDOCK, OF COLUMBUS, OHIO.

GAGE-COCK.

SPECIFICATION forming part of Letters Patent No. 751,538, dated February 9, 1904.

Application filed September 28, 1903. Serial No. 174,862. (No model.)

*To all whom it may concern:*

Be it known that I, SAMUEL N. MURDOCK, a citizen of the United States, residing at Columbus, in the county of Franklin and State of Ohio, have invented a certain new and useful Improvement in Gage-Cocks, of which the following is a specification.

My invention relates to the improvement of gage-cocks of that class which are adapted for use on locomotive or other boilers; and the objects of my invention are to provide an improved construction of gage-cock which may be utilized as a steam-gage or water-glass cock and which is provided with improved means for keeping the interior of the gage-cock and the entrance to the boiler free from obstructions, such as scale, dirt, &c.; to so construct my improved gage-cock as to admit of the same being taken apart and cleaned with ease and rapidity and without the necessity of first removing the steam from the boiler, and to provide other improvements the details of construction of which will be more fully pointed out hereinafter. These objects I accomplish in the manner illustrated in the accompanying drawings, in which—

Figure 1:
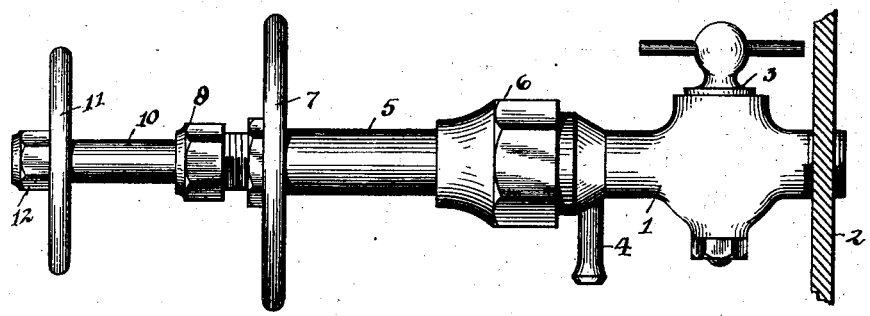
Figure 2:
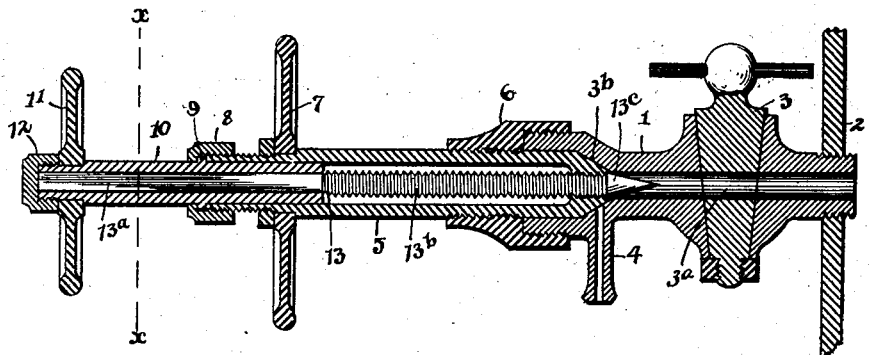
Figure 3:
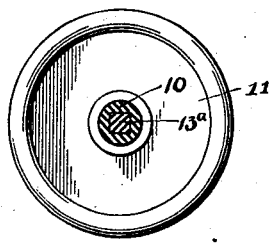

Figure 1 is a view in elevation of my improved gage-cock. Fig. 2 is a central longitudinal section of the same, and Fig. 3 is a transverse section on line $x$ $x$ of Fig. 2.

Similar numerals refer to similar parts throughout the several views.

In carrying out my invention I employ a tubular casing-body 1, one end of which is adapted, as shown, to be screwed or otherwise secured in connection with an opening of a boiler 2. The casing-body 1 is intersected by a suitable valve-body 3, said valve having an opening $3^a$ therethrough, which is adapted to be made to register with the central passage of the casing 1. The outer end of the casing 1 is enlarged and shaped to form on its inner side a conical valve-seat $3^b$, and from this outer end portion of said casing leads a tubular outlet 4. Into the larger end of the casing-body 1 extends the cone-like termination of a tubular valve 5, the latter being adapted to engage the seat $3^b$ and to close the entrance to the outlet 4. The tubular valve 5 is connected with the casing 1 through the medium of a suitable coupling or packing nut 6, one end of which screws onto said casing and the remaining portion of which has a threaded engagement with the valve 5. In its outer portion the valve 5 carries a suitable operating hand-wheel 7, and on the outer side of the latter said valve is externally threaded to engage the internal threads of a coupling or packing nut 8, the outer portion of which engages a peripheral flange 9 on a tubular member 10. The tubular member 10 extends, as shown, a desirable distance within the valve 5 and, as indicated more clearly in Fig. 3 of the drawings, has a square central bore or passage. The outer end portion of the member 10 carries a suitable hand operating-wheel 11 and beyond the latter a removable cap or stop-nut 12. Within the member 10 is slidably mounted the squared portion $13^a$ of a cleaner-rod 13, the forward portion of which is threaded, as indicated at $13^b$, and terminates in a cleaner-point $13^c$. As indicated in the drawings, the threaded portion $13^b$ is adapted to engage the internally-threaded forward and reduced end portion of the tubular valve 5. It is obvious that when the valve 3 is turned to the open position shown in the drawings and the valve 5 is turned outward until the opening to the outlet tube or nozzle 4 is uncovered the steam from the boiler may pass freely through said outlet for the usual test purposes. In case the entrance to the central passage of the casing 1 should become clogged by lime, scale, or dirt it will be understood that the turning of the hand-wheel 11 and the member 10 will result through the threaded engagement of the cleaner-rod with the forward end of the valve 5 in said cleaner-rod being fed forward through the central passage of the casing 1 and valve-opening $3^a$ until its pointed portion $13^c$ projects into the boiler. This operation, as will be seen, will result in forcing from the inlet to the casing 1 any obstruction and permitting when the cleaner-rod is returned to its normal position a free passage of steam or water to the outlet 4. In case the parts of the gage-cock which are on the outer side of the valve 3 should become clogged in any manner it will be understood that the valve 3 may be turned to the closed position, after which the various parts of the gage-body may be separated and cleansed. In this manner the cleaning of the gage-cock and its various parts may be accomplished without interfering with the steam or water in the boiler. While my device is described as a steam or water gage-cock, it will be understood that the same may be readily adapted for use as a water glass-cock.
From the construction and operation which I have shown and described it will be seen that a comparatively simple although effective gage-cock mechanism is provided which will permit of the entrance to the cock being thoroughly and quickly cleaned and by means of which the parts forming the gage-cock may be disconnected and cleaned without the necessity of first withdrawing the water or steam from the boiler.
Having now fully described my invention, what I claim, and desire to secure by Letters Patent, is—

1. In a gage-cock, the combination with a casing 1 adapted to be connected with a boiler, said casing having an outlet and a tubular valve 5 adjustably supported from said casing, and a tubular member 10 rotatably mounted in said valve 5, of a cleaner-rod having its rear portion slidably mounted in said member 10 and its forward portion threaded and engaging internal threads of said valve 5 and means connected with the valve 5 and member 10 to impart rotary motion thereto.

2. In a gage-cock, the combination with a casing 1 adapted to have one of its ends connected with a boiler, a valve 3 intersecting the central passage of said casing 1 and having a valve opening therethrough, said casing having an outlet and a valve 5 controlling said outlet, of a longitudinally-adjustable cleaner-rod passing through said valve 5 and adapted to be projected through the opening of the valve 3.

SAMUEL N. MURDOCK.

In presence of—
 EDMUND SMITH,
 C. C. SHEPHERD.